United States Patent [19]

Trombe et al.

[11] 3,925,062
[45] Dec. 9, 1975

[54] PROCESS FOR TREATMENT OF ORES

[75] Inventors: Jean-Christian Trombe; Gerard Montel, both of Toulouse, France

[73] Assignee: Etablissement Public: Agence Nationale de Valorisation de la Recherche Anvar, Neuilly sur Seine, France

[22] Filed: Aug. 2, 1972

[21] Appl. No.: 277,206

[30] Foreign Application Priority Data
Aug. 6, 1971 France............................ 71.28914

[52] U.S. Cl. ......................... 75/84; 423/21; 423/3; 423/19
[51] Int. Cl. ................. C22b 61/04; C22b 61/00; C22b 59/00
[58] Field of Search ............ 423/21, 39, 3, 19, 257, 423/4.5; 75/84, 84.4, 84.5

[56] References Cited
UNITED STATES PATENTS

| | | | |
|---|---|---|---|
| 2,485,841 | 10/1949 | Pacyna | 23/14.5 |
| 2,531,046 | 11/1950 | Hollingsworth | 71/47 |
| 2,725,284 | 11/1955 | Polissar | 423/19 |
| 2,773,736 | 12/1956 | Hollingsworth | 423/19 |
| 2,867,501 | 1/1959 | Hanley | 423/19 |
| 2,890,099 | 6/1959 | Rhodes et al. | 423/19 |
| 3,353,928 | 11/1967 | Woyski et al. | 423/19 |

*Primary Examiner*—Benjamin R. Padgett
*Assistant Examiner*—B. Hunt
*Attorney, Agent, or Firm*—Burgess, Dinklage & Sprung

[57] ABSTRACT

Process for treatment of ores, in particular phosphate ores, comprising treating said ores in powder form at an elevated temperature, within an atmosphere consisting at least partially of a gaseous halide or an oxyhalide, exclusive of fluoride or oxyfluoride, of a member belonging to group V or VI of the Periodic Table and recovering rare-earth, yttrium, uranium and/or fluorine compounds present in the effluent gas. Especially valuable metal elements are thus extracted from various ores, the usefulness of the latter being simultaneously enhanced after this treatment.

13 Claims, No Drawings

PROCESS FOR TREATMENT OF ORES

This invention relates to a process for treatment of ores and particularly of phosphate uraniferous ores.

According to a first aspect thereof, the invention relates to a method of extraction from ores, especially from phosphate ores, of metal values contained therein, in particular of rare earth, yttrium and mainly of uranium which may be present.

Such an extraction of metal values, which are often present in trace amounts in ores, is highly useful, in particular if it can be effected on industrial scale on the very site where ore is mined.

Thus with respect of uranium, recent geological studies have shown that a large proportion of uranium available in the earth crust is present in a very diffuse state, viz: a maximum content of 6000 ppm, in various ores; among the latter, naturally occurring apatites seem to constitute an especially valuable reserve of uranium.

According to a second aspect thereof, the invention further relates to extraction of fluorine from phosphate ores containing the same, even in small amounts. Phosphate ores from which it is desired to extract the aforesaid metal values, can also contain fluorine. This is the case of fluorapatite i.e. fluorinated natural clacium phosphate of the ideal formula $Ca_{10}(PO_4)_6 F_2$, which is one of the main components of natural phosphate deposit. It is well known that the fertilizer activity of said fluorapatite is considerably enhanced by previous elimination of fluorine.

Elimination of fluorine from fluorapatite can be effected by treating phosphates with silica at temperatures of at least 1300° to 1400°C, as described by TROMEL in "Phosphorsäure" 12, 65, 1952. It is likewise known to decompose fluorapatite, at temperatures below 1000°C, by the action of calcium metaphosphate or phosphorous pentoxide, as disclosed e.g. by MONTEL and CHAUDRON in C. R. 233,318 (1951) and MONTEL in Bull, Soc, Chim. 19,379 (1952). However, the latter reactions cause a conversion of O-phosphoric groups to pyro- or m-phosphoric groups.

The methods used at present for extracting uranium from ores containing the same are of two kinds: those of the first kind make use of dissolving and solvent-extraction or extraction by means of exchanger resins, at a temperature which is nearly ambient. The methods of the second kind involve a reaction, viz. ore-chlorine or ore-hydrogen chloride, if desired in the presence of carbon or carbon monoxide, at a temperature of about 300°-1500°C.

The methods of the first kind have been very amply studied but they have a major drawback of requiring a first stage for destroying the crystalline network of the ore and the practicing thereof belongs accordingly to physico-chemistry of solutions.

Methods of the second kind have been described, for instance, by Zienkiewicz and T. Adamski in an article entitled "chlorinating, the most universal concentration method and uranium ores", Nucleonika IX, pages 587 – 599 (1964). Further, U.S. Pat. No. 2,531,046 discloses a process of chlorinating ores of the fluorapatite type; this chlorinating method is a process which is useful for extraction of uranium from ores containing the same. It provides a sublimation of uranium in the form of chlorides or oxychlorides and a condensation of the sublimated product in suitable cold regions of the plant. However, this process causes a partial, and oftentimes substantial, destruction of the starting ores, generally with formation of chlorides.

According to U.S. Pat. No. 2,531,046, a substantial portion of fluorine in fluorapatites is replaced by chlorine, by reacting said fluorapatites at a high temperature, in the presence of a suitable chlorine-containing gas, which is preferably chlorine or hydrogen chloride gas. According to this process, it is necessary to form porous agglomerates of fluorapatite by way of forming a slurry, thereafter evaporating water therefrom, preferably in the presence of carbonaceous compounds; in the course of fluorine-displacement reaction, the latter is released almost entirely as hydrofluoric gas HF, this being confirmed by the need, in the aforesaid process, of also using steam in the reaction when chlorine gas is used as chlorinating agent. Moreover, the sole fraction of chlorine-based reactant used in the process, which may be, if desired, recovered without difficulty in order to recycle it to the process, is gaseous $Cl_2$ or HCl in excess with respect to the required amount for replacing fluorine atoms by chlorine atoms in fluorapatite.

Moreover, the process in accordance with the cited patent has substantial drawbacks inherent to the use of a gaseous reactant, the conveyance and handling of which are difficult, especially when dealing with deposits at locations distant from production units of said gaseous reactants; besides, the high consumption of said reactants has proved to be economically unattractive, so that the process as a whole is commercially unacceptable.

It has now been found that it is possible to extract from ores, in particular from phosphate ores, rare earth as well as yttrium and uranium and/or fluorine, which may be present in said ores, by treating the latter in powdered form at a temperature of at least 600°C, preferably of at least 800°C and most preferably from about 800° to 1100°C, under pressure conditions such that a halide or oxyhalide reactant will be in a gaseous state. As a rule, atmospheric pressure is preferred but a pressure lower than atmospheric, for example, could be used, especially if the gas used in the process is diluted with another gas, or a pressure above atmospheric pressure could be used if desired.

Rare earth elements or metals belong to the group of lanthanides, viz: lanthanum, cerium, praseodymium, neodymium, promethium, samarium, europium, disprosium, holmium, gadolinium, terbium, erbium, thulium, ytterbium and lutetium.

Yttrium (atomic $N^r$ 39), without being itself a lanthanide, is found in association with rare earth elements, as is well known and can accordingly hardly be separated therefrom.

Generally the halides and oxyhalides which are useful for the purpose of this invention are essentially selected from the group consisting of chlorides, bromides, iodides, and oxychlorides, oxybromides and oxyiodides of the members of groups V or VI of the Periodic Table of the Elements.

The halides and oxyhalides which will be used in practice are essentially nitrosyl chloride NOCl, sulfuryl choride $SO_2Cl_2$, phosphorus trichloride $PCl_3$ and phosphorus oxychloride $POCl_3$, although other halides or oxyhalides of a member of groups V or VI of the Periodic Table are likewise suitable.

Accordingly, the specific object of the present invention is to provide a process for extracting from ores, in particular phosphate ores, metal values especially rare earth elements, yttrium and uranium and/or fluorine which may be contained in said ores, which process comprises treating these ores in powdered state at a temperature of about 1000°C, within an atmosphere consisting, at least partially, of nitrosyl chloride NOCl, sulfuryl chloride $SO_2Cl_2$, phosphorus oxychloride $POCl_3$ or phosphorus trichloride $PCl_3$.

A particularly advantageous embodiment of the process of the invention, using nitrosyl chloride NOCl, comprises operating in an atmosphere consisting of a mixture of nitrosyl chloride NOCl and nitrogen dioxide $NO_2$-$N_2O_4$, prepared from nitrogen dioxide $NO_2$ treated by being passed over an alkali or alkaline-earth metal chloride, e.g. sodium chloride or anhydrous calcium chloride.

In this specific embodiment of the inventive process, the starting gaseous reactant is nitrogen dioxide $NO_2$. The latter is treated by passing it through columns containing anhydrous calcium chloride. Upon passage of the gas over calcium chloride, there is produced a reaction similar to the one described in connection with alkaline chlorides and which consists of a partial conversion of nitrogen dioxide into nitrosyl chloride, as shown by CONSTANT and HATTERER in Bull. Soc. Chim. 6 1888 (1969) and 11, 3806 (1969).

Likewise the phosphorus oxychloride $POCl_3$ can be obtained according to a reaction similar to the one described by MONTEL and CHAUDRON in C. R. 233,318 (1951), by contacting between 500° and 1000°C phosphoric anhydride, an alkali or alkaline-earth metal metaphosphate, or an alkali or alkaline-earth metal pyrophosphate on the one hand and an alkali or alkaline-earth metal chloride on the other hand. In particular the phosphoric anhydride may be obtained by reduction of the phosphated ore itself, according to the procedure well known in the art which leads to the production of ortho-phosphoric acid. In the latter case the initial reagents are carbon and the alkali or alkaline-earth metal chloride.

While not wishing to limit the invention by any theoretical explanation, it is believed that the observed fact i.e. that the yield of the process is the better, for a given contact time, or that the contact time required for obtaining the same displacement and/or extraction rates, is the shorter, when using ore of a smaller particle size, should be considered jointly with the fact that the smaller the particle-size of the solid feed, the better the contact between the solid and the gas, in the course of which the reaction of the invention takes place.

Metal values extracted in a combined state are in general entrained in the gas phase but, if desired, they may be fixed by means of a simple condensation, for instance in a suitable cold region of the plate. Fluorine itself may be retained by means of a suitable reagent, such as for example silica.

The particle size of the fluorapatite feed is not critical. However, a particularly advantageous embodiment of the present process comprises subjecting said feed to a pregrinding step.

As already mentioned, the gaseous reactant to be used is a halide or oxyhalide, exclusive of a fluoride or oxyfluoride, of a member of group V or VI of the Periodic Table. Gaseous reactants, especially preferred by the applicants, are nitrosyl chloride NOCl, if desired in admixture with nitrogen dioxide, sulfuryl chloride $SO_2Cl_2$, phosphorus oxychloride $POCl_3$ and phosphorus trichloride $PCl_3$. Said reactant gas may constitute a mere fraction of the atmosphere surrounding fluorapatite to be treated, the remainder of said atmosphere being comprised of air or another gas inert towards the compounds to be reacted under the conditions of the reaction.

A particularly advantageous embodiment of this process, wherein the treated material is uraniferous fluorapatite, i.e. uraniferous fluorinated natural calcium phosphate, comprises extracting from fluorapatite ore especially valuable metal elements and obtaining moreover, after said extraction, a halogenated apatite substantially free of fluorine having enhanced properties as a fertilizer.

Moreover it is to be noticed that in some cases the extraction of metallic elements may be carried out before the defluorination proceeds to a large extent: the amount of gaseous reactants may thus be limited, particularly where the extraction of metallic elements, instead of defluorination, is the main purpose.

In fact the halogenated substantially fluorine-free apatite, such as chlorapatite, prepared by the process of the invention, forms a solid solution with fluorapatite being used. To the explicit, the latter changes gradually in the course of the treatment, e.g. towards chlorapatite, resulting in a concomitant improvement of fertilizing properties of the treated phosphate.

As is known to the skilled in the fertilizer art, the fertilizing properties of phosphates are closely related to the solubility thereof in citric acid or hydroxy-3-carboxy-pentanedioic acid.

Accordingly, tests have been performed to determine the solubility of both the starting fluorapatite and the chlorapatite obtained by the invention, in ammoniacal ammonium citrate and in citric acid (in conformity with French Standards NF U 42.113, U 42 243 and U 42 212)

As will be shown in detailed examples to follow, halogenated substantially fluorine-free apatite, e.g. chlorapatite, is practically insoluble in ammoniacal ammonium citrate, as is the case of fluorapatite.

On the contrary, solubilization tests in citric acid evidence a considerable increase of solubility of halogenated substantially fluorine-free apatite (e.g. chlorapatite) obtained by the method according to this inventin, with respect to starting fluorapatite. invention, Tests performed on a naturally occurring phosphate containing inter alia, uranium (about 3000 ppm) have shown that more than 95% of said uranium is extracted from the phosphate; the latter, being originally of fluorapatite structure, changes towards chlorapatite, whereby the processing according to the invention may enable both uranium to be extracted and the value of phosphate as fertilizer to be improved.

The starting fluorapatite can thus be of any natural or non-natural origin, such as kola phosphate or synthetic fluorinated apatite.

The process according to this invention is not limited to the treatment of fluorapatite and it may be applied under equivalent conditions to non apatitic ores, as will be seen from the examples detailed below. The ore to be treated may be xenotime, which is a naturally-occurring yttrium phosphate of ideal formula $YPO_4$.

The process is also very valuable from industrial and economie points of view, since compounds fed into the system in order to prepare a gaseous reactant are halides, possibly consumed in small amounts, and a gas which is practically not consumed and thus may be recycled to the process.

Moreover, the structure of ore is generally only very slightly attacked, or even not altered, in the course of the subject extraction process, as will be shown later in the specification.

Power and reactant consumption, as well as side-products formation are thus minimized.

Elements other than fluorine, extracted during the treatment, are preferably recovered by condensation on suitable cool sections of the plant.

While in the present state of technical knowledge it is difficult to accurately ascertain the precise nature of deposit collected after extraction, it has been found that the deposit formed in the process of the invention is substantially not halogenated and appears as an oxygenated compound. Accordingly, there occurs a release of the major part of the halogen which has been combined in the preceeding extraction step and said halogen may thus be recycled, hence reducing consumption of starting halide to a very small level.

The method of the invention is not restricted to any particular ore and can be practiced on numerous phosphate ores, both or apatite and non-apatite types, such as kola phosphate, uraniferous natural phosphates, for example Langesundfjord ores (Norway), Narestoe (Norway), Fukushima ores (Japan) and Gascoyne ores (West Australia), and xenotime (natural yttrium phosphate of ideal formula $YPO_4$).

The residue of the treatment consists essentially of ore freed of extracted elements: it may be used for its own properties (this being the case of uraniferous apatites which can be defluorinated by the process of the invention and thus be endowed with fertilizing properties), or be returned to the natural circuit without pollution hazards; it may also be used in the case of fluorapatite, as starting product for the manufacture of phosphoric acid free of metallic impurities.

The invention will be illustrated by the following examples, given merely by way of an explanation without limiting the scope of the invention as defined by the appended claims:

EXAMPLE 1

The starting gaseous reactant was nitrogen dioxide $NO_2$-$N_2O_4$ and it was treated by being passed through columns containing anhydrous calcium chloride. Upon passage of the nitrogen dioxide over the calcium chloride there took place a partial-conversion reaction of nitrogen dioxide into nitrosyl chloride. Thus, there was collected, in a trap cooled by an ice-salt mixture, a mixture of NOCl and $NO_2$-$N_2O_4$.

The uraniferous ore to be reacted was placed in powder form in a scoop and was heated to about 1000°C in the presence of the above-described gaseous reactant.

The treated ore was an uraniferous ore of African origin, the elementary analysis of which, before treatment, showed it to contain, by weight, 0.516% uranium, 0.87% $CO_2$, 0.08% $P_2O_5$ and 0.0133% fluorine.

After treatment during 24 hours under the indicated conditions the uranium content of thus-treated ore was only 0.137% by weight. The uranium content of thus-formed deposits on cool parts of the installation was of 6.28% by weight.

EXAMPLE 2

The procedure used was the same as in example 1, but the treated ore was an uraniferous ore from Hérault (France), the average analysis of which, before treatment, showed that it contained by weight 0.14% uranium, 10.32% $CO_2$, 0.15% $P_2O_5$ and 0.019% fluorine.

Upon a 24 hour treatment under operating conditions disclosed in example 1, there was obtained a considerable lowering of the uranium content of the thus-treated ore, which was then only of 0.008% by weight. The uranium content in deposits on cool portions of the apparatus was 0.60% by weight.

EXAMPLE 3

The procedure was the same as in example 1, but the treated ore was an uraniferous ore from Haute-Vienne (France), the average analysis of which, before treatment, showed that it contained, by weight 0.272% uranium, 0.17% $CO_2$, 0.33% $P_2O_5$ and 0.098% fluorine.

Upon a 24 hour treatment under the same operating conditions as in example 1, there was obtained an important extraction, the uranium content of the treated ore being thus only of 0.034% by weight. The uranium content of deposits formed on the cool portions of the apparatus was 2.130% by weight.

EXAMPLE 4

The treatment described in example 1, under processing conditions specified therein, was continued during a further period of 24 hours on each of the ores of examples 1, 2 and 3, respectively. Results are reported in table I hereunder.

TABLE I

| Treated ore | Uranium content after 48 hours of treatment (% by weight) | Uranium content of deposits formed in the course of the second 24 hours treatment period (% by weight) |
|---|---|---|
| Ore of example 1 | 0.023 | 6.110 |
| Ore of example 2 | 0.005 | 0.119 |
| Ore of example 3 | 0.015 | 1.910 |

EXAMPLE 5

The procedure was the same as in example 1, but the treated ore was a sample of phosphated ore having an apatitic structure and the average analysis of which, before treatment, showed that it comprises, by weight, 0.311% uranium, 28.6% $P_2O_5$ and 2.75% fluorine.

After treatment during 24 hours under the same conditions as in example 1, the uranium content of the ore sample was only 0.084% by weight, whereas the fluorine content thereof was still 1.80% by weight.

The treatment was carried on for another period of 24 hours under the same conditions; the uranium content of the treated ore sample was then 0.066% by weight, and the fluorine content thereof was 1.56% by weight.

EXAMPLE 6

Powdered uraniferous ore, similar to that of example 1, was placed in a scoop and was heated at about 800°C in the presence of commercially available sulfuryl chloride $SO_2Cl_2$ as a reactant.

The uranium content of deposits formed on cool portions of the apparatus was similar to the one provided by the procedure of example 1 wherein nitrosyl chloride had been used. Moreover the X ray spectrum showed a slight alteration of the structure which alteration could be attenuated, or even avoided, by use of milder conditions.

EXAMPLE 7

Phosphate ore subjected to the processing according to the invention was natural uraniferous fluorapatite from Central African Republic.

Said ore was reacted in powdered state in a scoop by heating to about 1000°C in the presence of $POCl_3$ under conditions such as to maintain $POCl_3$ in gaseous state.

Phosphorus oxychloride $POCl_3$ used as a reactant had been prepared by a reaction at about 700°C between calcium pyrophosphate and calcium chloride.

Processing for about 6 hours under the above-disclosed operating conditions gave a solid solution of fluorinated apatitic calcium phosphate and chlorinated apatitic calcium phosphate, with partial discoloration of the treated phosphate. The deposit on a cool portion of the apparatus was similar to the one obtained in the course of treatment by the $NOCl/NO_2$-$N_2O_4$ mixture of ore in example 1.

EXAMPLE 8

The same ore as in example 7 was treated during 6 hours at about 600°C in the presence of commercial phosphorus trichloride.

The results were similar to those of example 7, viz: substantial deposits on cool portions of the apparatus, which deposits contained the major portion of uranium initially present in the ore, concomitantly with a partial discoloration of said ore and without notable alteration of the apatite structure thereof.

EXAMPLE 9

There have been determined the crystallographic parameters of the hexagonal structure of apatite ore of example 7. There have been found for cuptallographic parameters: $a = 9.364$ A. and $c = 6.899$ A., The same parameters a and c have been determined for the same ore but treated, respectively (1) according to example 4; (2) under same conditions but for 80 hours instead of 48 hours; (3) according to example 7; and (4) by chlorine gas for 24 hours at 1000°C.

Results are summarized in table II hereunder.

TABLE II

| Crystallo-graphic parameters | Ore | Treatment | | | |
|---|---|---|---|---|---|
| | | 1) | 2) | 3) | 4) |
| a (in A) | 9.364 | 9.417 | 9.458 | 9.458 | 9.634 |
| C (in A) | 6.899 | 6.864 | 6.852 | 6.860 | 6.766 |

The X ray diffraction spectra showed additionally that novel solid phases formed after treatment 4), which clearly prooved that prior-art treatments using e.g. chlorine gas, attacked the apatite structure, whereas the process of the invention leaves the latter practically unaltered.

EXAMPLE 10

The operation was similar to that of example 1, but the treated ore was xenotime or natural yttrium phosphate.

The treatment resulted in formation of a deposit as well as a change of color of the ore.

The X-ray fluorescene of raw xenotime ore was very intricate, due to the great number of elemental components in said ore. Obviously, the major component was yttrium. However, the particularly, complex lattice effects did not permit establishing even an approximate value of the percent content of the various detected elements.

Nevertheless, it was possible to determine qualitatively that raw xenotime ore contained yttrium and very probably various rare earths, tin, titanium and iron, amongst others. Following a treatment as in Example 1, it was possible to determine by fluorescence (X rays) the nature of the main components of the brown deposit formed on a cold portion of the apparatus. These elements were:

| yttrium Bands | (substantial proportion). | | |
|---|---|---|---|
| | $K\alpha_1$ | order 1 | 24°.80 |
| | $K\alpha_2$ $K\beta_1$ | order 1 | 21°.20 |
| | $K\beta_3$ $K\beta_1$ | order 2 | 43°.15 |
| | $K\beta_3$ $K\alpha_1$ | order 2 | 48°.80 |
| | $K\alpha_2$ $K\alpha_1$ | order 3 | 76°.50 |
| Iron Bands | (substantial proportion) | | |
| | $K\alpha_1$ | | |
| | $K\alpha_2$ | | 57°.50 |
| | $K\beta_1$ | | 51°.71 |
| Tin Bands | (Substantial proportion) | | |
| | $K\alpha_1$ | order 1 | 14°.10 |
| | $K\alpha_2$ $K\beta_1$ | order 1 | 12°.40 |
| | $K\beta_3$ $K\alpha_1$ | order 2 | 28°.40 |
| | $K\alpha_2$ $K\beta_1$ $K\beta_3$ $K\alpha_1$ | order 2 | interfere with bands $K\alpha$ of yttrium |
| | $K\alpha_2$ $K\beta_1$ | order 3 | interfere with bands $K\beta$ order 2 of yttrium |
| | $K\beta_3$ | order 3 | 37°.85 |

The separation of rare eath metals, though it was difficult to prove by the presently known means, appeared as being very probable, said rare earth metals accompanying yttrium, which was present in major proportion.

EXAMPLE 11

The treatment of the xenotime ore of example 10 was continued for an additional 24 hour period under operating conditions specified in example 1. There was thus collected, in the course of the second day of processing, a substantial deposit of yttrium.

EXAMPLE 12

Various fluoropatites were treated under conditions mentioned in example 1.
a. Treatment of synthetic fluoropatite
A fluorinated apatite was prepared by reacting calcium pyrophosphate with calcium fluoride. Thus-prepared fluorinated apatite was in a very finely divided state having an average particle size of about one micron.

Fluorine and chlorine proportions in the initial material and in the product prepared according to the invention (as in example 1) were as follows:

| | F (wt %) | Cl (wt %) |
|---|---|---|
| Starting fluorapatite | 4.19 | 0 |
| Final product : | 0.35 | 6.44 | b. Treatment of a natural fluorinated apatite.

The treatment described in example 1 was carried out on kola phosphate powder (commercially available product). This phosphate is a fluorinated natural calcium phosphate in a substantially pure state.

A 5-day treatment under stated operating conditions gave a solid solution of fluorapatite and chlorapatite, the attack having been seemingly complete on the finest particles.

The above product was then ground using an agate mortar and it was subjected once more to the reaction according to the invention for 8 additional days.

There was thus obtained a phosphocalcic apatite in which 9% of the initial fluorine ions have been replaced by chlorine ions.

EXAMPLE 13

The process was similar to example 1, but such as to render the displacement reaction very slow. Accordingly, a study could be made of the progress thereof, the results of which are reported in table III hereunder, in which crystallographic parameters of the hexagonal crystals appear in the first column ($a$ and $c$ for each case), while in the second column is shown the weight percentage of chlorine present in the respective apatite.

TABLE III

| Original | Crystallographic Parameters (A) | Percentage of chlorine (by weight) |
|---|---|---|
| Fluorapatite | $a = 9.36_7$<br>$c = 6.88_2$ | 0% |
| Treated for 7 days | $a = 9.47_5$<br>$c = 6.84_9$ | 2.87% |
| Treated for 15 days | $a = 9.52_2$<br>$c = 6.83_4$ | 3.91% |
| Treated for 23 days | $a = 9.60_0$<br>$C = 6.79_7$ | 6.16% |
| Treated for 28 days | $a = 9.61_9$<br>$c = 6.78_0$ | 6.44% |

EXAMPLE 14

The same fluorinated natural and synthetic apatites as in example 12 were treated, using $SO_2Cl_2$ as gaseous reactant and there were obtained, with a very good yield, chlorapatites which were also suitable for subsequent use e.g. as phosphate fertilizers, after mixing them with other solids.

EXAMPLE 15

Assessement of fertilizer properties of chlorapatite

Solubility tests were performed with both starting fluorapatite and chlorapatite prepared by the process of the invention, using as solvents ammoniacal ammonium citrate and citric acid, as well understood by these skilled in the art (French Standards NF U 42, 113, U 42, 243 et U 42 212).

It was noted that chlorapatite was always, like fluorapatite, substantially insoluble in ammoniacal ammonium citrate.

As to solubility in citric acid, a considerable increase of solubility could be demonstrated upon conversion of any fluorapatite into corresponding chlorapatite, by this process.

Results obtained with various apatites are shown in the following table IV.

TABLE IV

| Product | weight % of $P_2O_5$ assimilable in citric reactant | | weight% $P_2O_5$ contained in the product |
|---|---|---|---|
| Synthetic Fluorapatite; | 25.6 | | 42.2 |
| Chlorapatite obtained from this fluorapatite | 41.0 | 100% | 40.9 |
| Kola phosphate | 6.7 | | ≃ 42 |
| Same phosphate subjected to chloriding treatment | 33.9 | 83% | ≃ 40.9 |

It is worthwile noting the relatively higher solubility of the tested synthetic fluorapatite, which fact should be related to the very fine particle size thereof. Moreover, its treatment by nitrosyl chloride according to the invention made it completely soluble in the citric reactant, as demonstrated (within the limits of experimental errors) by the numerical values in the second entry of table IV.

Commerical kola phosphate is, on the other hand, of low solubility. A substitution, according to the invention, of 90% fluorine ions by chlorine ions enables the product to be soluble to the extent of 83%. It is to be noted that a continuation of the defluorinating treatment could increase said solubility still further.

What we claim is:

1. The process for the treatment of an ore containing at least one of a rare earth element, yttrium and uranium to free said ore thereof and to concentrate said rare earth element, yttrium and uranium, which comprises heating said ore in powder form in an atmosphere consisting essentially of a gaseous halide or oxyhalide of a member of Group V or VI of the Periodic Table other than a fluoride or oxylfluoride of such member, removing effluent gas containing at least one of said rare earth element, yttrium and uranium while leaving the structure of said ore intact, and recovering said rare earth element, yttrium and uranium from said effluent gas by condensation.

2. Process according to claim 1, wherein said ore is fluorapatite or xenotime.

3. Process according to claim 1, wherein said atmosphere comprises at least partially nitrosyl chloride NOCl, sulfuryl chloride $SO_2Cl_2$, phosphorus oxychloride $POCl_3$ or phosphorus trichloride $PCl_3$.

4. Process according to claim 1, wherein said atmosphere comprises at least partially a mixture of nitrosyl chloride NOCl and nitrogen dioxide, alkali metal.

5. Process according to claim 1, wherein the temperature of treatment is of at least 600°C under normal pressure.

6. The process of claim 1, wherein said ore is a phosphate ore.

7. The process of claim 1, wherein the compounds obtained by condensation are substantially free of halogens, after condensation the effluent gas being recycled for use in heating further ore.

8. The process of claim 1, wherein the ore contains fluorine and the effluent gas contains fluorine, the effluent gas being contacted with silica for removal of the fluorine therefrom.

9. The fluorapatite residue produced by the process of claim 2 wherein almost all of the fluorine has been replaced by other halogen atoms.

10. Process according to claim 4, wherein said mixture is prepared from nitrogen dioxide $NO_2$ treated by being passed through sodium chloride or anhydrous calcium chloride.

11. Process according to claim 5, wherein treatment temperature is between 800° and 1100°C under normal pressure.

12. Process according to claim 5, wherein said temperature is of about 1000°C under normal pressure.

13. The process of claim 6, wherein a portion of said ore is reduced to produce phosphoric anhydride, said phosphoric anhydride is reacted with an alkali or alkaline earth metal chloride at about 500° to 1000°C to produce phosphorus oxychloride, and the phosphorus oxychloride is present in the atmosphere in which said ore is heated.

* * * * *

UNITED STATES PATENT AND TRADEMARK OFFICE
CERTIFICATE OF CORRECTION

PATENT NO. : 3,925,062
DATED : December 9, 1975
INVENTOR(S) : Jean-Christain Trombe et al It is certified that error appears in the above-identified patent and that said Letters Patent are hereby corrected as shown below:

| Patent | | Specification | | |
|---|---|---|---|---|
| Col. | line | page | line | |
| 3 | 53 | 7 | 6 | cancel "plate" and substitute -- plant--. |
| 4 | 44 | 8 | 25 | correct spelling of "invention". |
| 4 | 45 | 8 | 26 | cancel "invention". |
| 7 | 39 | 14 | 25 | correct spelling of "crystallographic". |
| 8 | 1 | 15 | 18 | after "fluorescene" insert -- spectrum--. |
| 9 | 24 | 18 | 14 | cancel "9%" and substitute -- 92%--. |
| 10 | 33 | 21 | 18 | correct spelling of "Commercial" |
| 10 | 61 | 22 | | Claim 4, cancel ", alkali metal". |

Signed and Sealed this

Twenty-fourth Day of August 1976

[SEAL]

Attest:

RUTH C. MASON
*Attesting Officer*

C. MARSHALL DANN
*Commissioner of Patents and Trademarks*